G. E. SEARING.
DEVICE FOR RELEASING THE CAPS OR COVERS FOR GLASS FRUIT JARS.
APPLICATION FILED MAY 6, 1908.
936,575.  Patented Oct. 12, 1909.
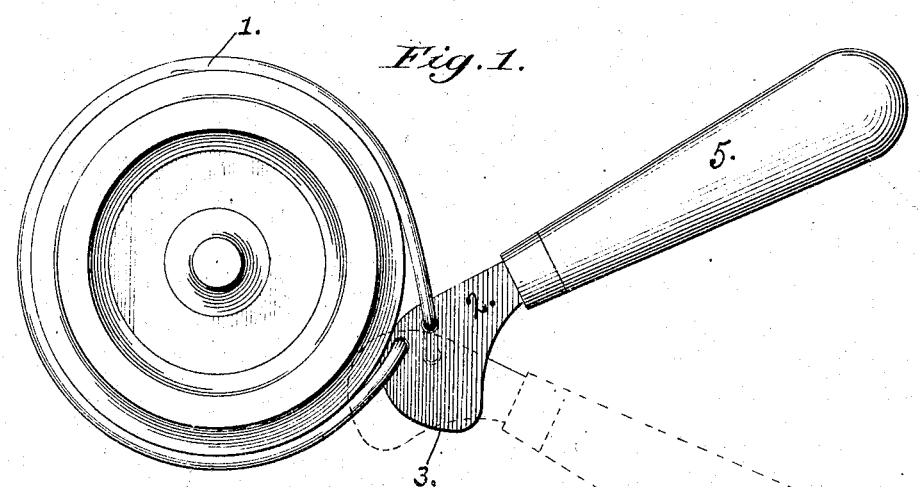
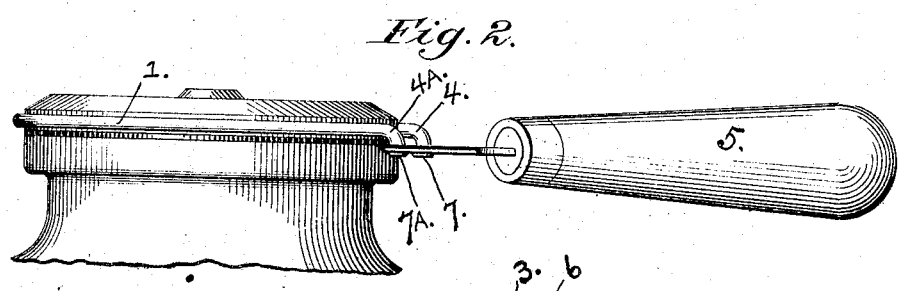
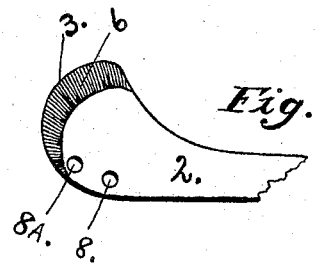
Witnesses:
Inventor:
George E. Searing.

UNITED STATES PATENT OFFICE.

GEORGE E. SEARING, OF TOWANDA, PENNSYLVANIA.

DEVICE FOR RELEASING THE CAPS OR COVERS FOR GLASS FRUIT-JARS.

936,575.

Specification of Letters Patent.

Patented Oct. 12, 1909.

Application filed May 6, 1908. Serial No. 431,142.

*To all whom it may concern:*

Be it known that I, GEORGE E. SEARING, a citizen of the United States, residing at Towanda, in the county of Bradford and State of Pennsylvania, have invented a new and useful Device for Releasing the Caps or Covers on Glass Fruit-Jars, of which the following is a specification.

My invention relates to a device for loosening the caps or covers of hermetically sealed glass fruit jars and has for its object a simple, durable and efficient means of allowing air to enter the fruit jar and permitting the easy removal of the cap or cover with safety to the operator, without injury to the jar, rubber ring, or jar cap or cover, and doing away with the use of knife points, fork tines and other methods now generally used.

In order to enable those skilled in the art to make and use my invention, I describe below the same in detail, reference being had to accompanying drawing in which—

Figure 1 is a top view of the device showing the ring-shaped metal band around a jar and the dotted lines showing position of blade after it has loosened or released the cap or cover of jar. Fig. 2, is side or vertical view with the ring shaped metal band around the top of a jar. Fig. 3, is detail view of that part of blade having sharpened or beveled end and also showing the position of holes in blade.

Similar reference numerals refer to similar parts throughout the several views.
In said drawing the reference-numeral. 1 indicates a metal band, shaped as a ring, which is bent at right angles near both terminating ends at points marked 4 and 4$^A$ on said drawing and terminating at points 7 and 7$^A$ all of which is fully shown in Fig. 2 of said drawing.

Numeral 2 indicates the metal blade which is beveled on portion 6 sufficient to make a cutting edge at 3. The blade 2 extends and forms a shank, which shank may be of such size to enter into handle 5, or may be so formed or shaped to make a handle of itself, thus doing away with separate handle 5. The blade 2 also has two holes 8, and 8$^A$ into which the terminals 7 and 7$^A$ of ring shaped metal band 1 enter and to keep and maintain the ring shaped band 1 in this relative position to blade 2, the terminating ends 7 and 7$^A$ of the ring shaped metal band 1 are riveted swaged or clenched after being passed through the holes 8 and 8$^A$ in blade 2. The holes 8 and 8$^A$ are sufficiently large to admit the bent down ends of ring shaped metal band 1 to easily turn in holes 8 and 8$^A$ after the terminals 7 and 7$^A$ are riveted, clenched or swaged. It will be noted by referring to drawing that the ring shaped metal band 1 terminal 7 enters hole 8 and terminal 7$^A$ enters hole 8$^A$.

The implement or device is operated in the following manner. The fruit jar cover or cap is first relieved of its clamps, catches or fastenings in the usual manner. The implement is then held by the handle 5 with the right hand, with the cutting edge 3 of blade 2 on the right hand side of the jar, the metal band 1 is then passed down over the top of the jar until it comes approximately on line with the rubber band on the fruit jar, where it is held in that position with the left hand, the handle 5 is then drawn toward the operator which has the two-fold effect of rapidly reducing the diameter of the metal band 1 causing it to grasp or clamp the jar at point mentioned above and also of causing the cutting edge 3 of blade 2 to press on or close alongside of the said rubber band which will admit air to the inside of the jar, thereby loosening or releasing the cap or cover of the jar.

It will be noted in the above description of operating the implement, reference is made to holding the handle 5 of the implement with the right hand. In this case the terminals 7 and 7$^A$ are to be downward or on the underside of blade 2. It however is obvious that the device may be used or operated with the handle on the left, in which case the terminals 7 and 7$^A$ should be uppermost or on the upper side of the blade 2.

What I claim is,

1. The combination in a fruit jar cover or cap loosener or releaser of metal band to encircle a fruit jar at the point of rubber band on said jar and attached to a metal blade formed with a handle on one end and a cutting edge on the other end, and the metal band attached to said metal blade in such a manner that when the handle of the blade is given a circular movement toward the metal band on substantially the same plane as the metal band, the metal band will decrease in size or diameter and grip or clasp the jar and permit the said cutting edge of said blade to press against or alongside of said rubber band with sufficient force to admit air to the inside of the jar, substantially as described.

2. In a device of the character described, a longitudinal plate having a pair of openings formed in one side thereof, and a flexible band adapted to surround and grasp the jar cover having its ends secured in said openings, the end of the plate adjacent the openings being beveled and rounded from the openings to form a cam shaped portion, the rotation of the outer end of the plate rocking it on said rounded portion and tightening the band, thus forcing the edge of the plate under the cover of the jar and lifting the same.

In testimony whereof I have affixed my signature in the presence of two witnesses.

GEORGE E. SEARING.

Witnesses:
    JOHN W. CODDING,
    E. L. SMITH.